Aug. 21, 1951  W. S. FREDENHAGEN ET AL  2,565,174
AUTOMATIC SANDWICH GRILL
Filed April 15, 1947  2 Sheets-Sheet 1
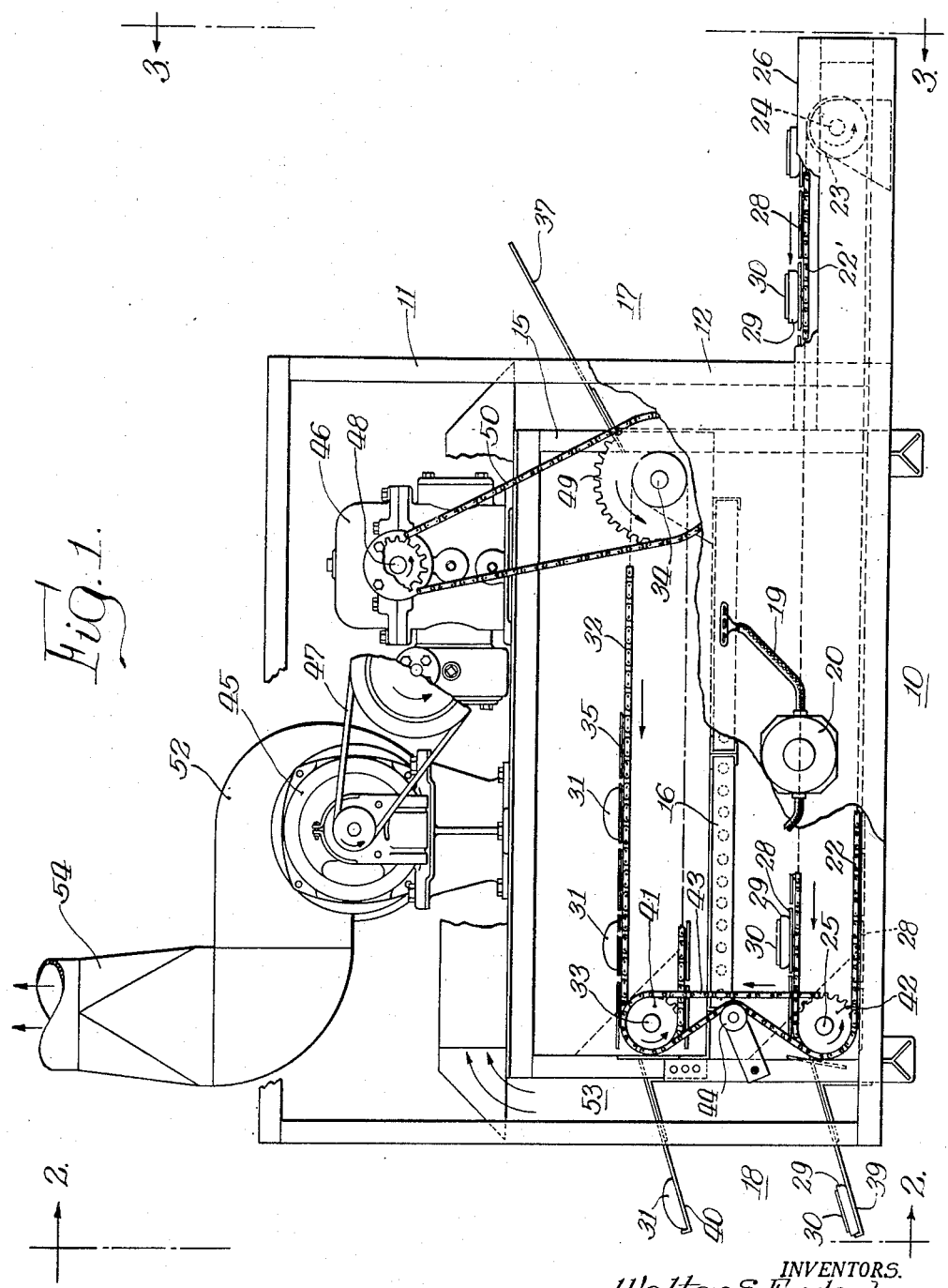
INVENTORS.
Walter S. Fredenhagen,
BY Mark S. Schmidt,
Richard D. Mason
Atty.

Aug. 21, 1951  W. S. FREDENHAGEN ET AL  2,565,174
AUTOMATIC SANDWICH GRILL
Filed April 15, 1947  2 Sheets-Sheet 2
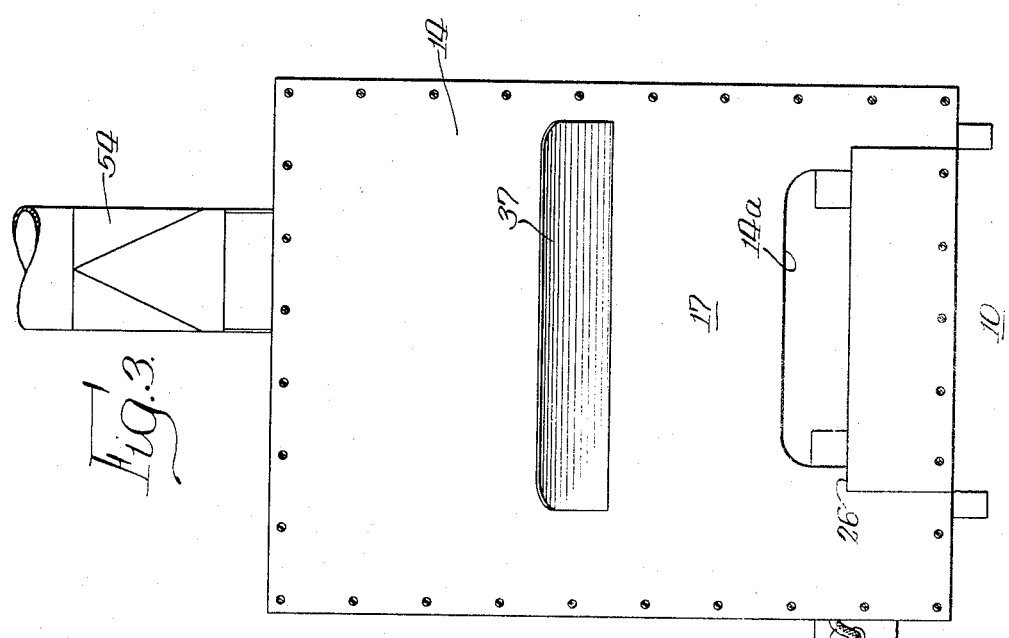
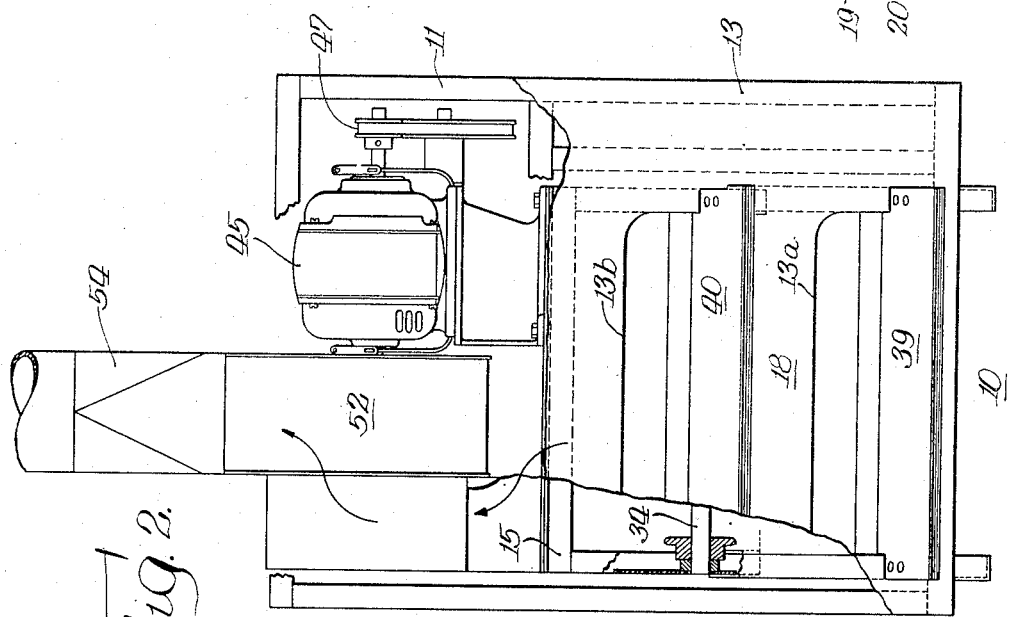
INVENTORS.
Walter S. Fredenhagen,
BY Mark S. Schmidt,
Richard D. Mason
Atty.

Patented Aug. 21, 1951

2,565,174

UNITED STATES PATENT OFFICE 2,565,174

AUTOMATIC SANDWICH GRILL

Walter S. Fredenhagen and Mark S. Schmidt, Naperville, Ill.

Application April 15, 1947, Serial No. 741,596

7 Claims. (Cl. 99—386)

1

The present invention relates to an automatic sandwich grill and more particularly to a device for automatically grilling sandwich fillers for sandwiches such as hamburgers, cheeseburgers, hot dogs, and the like, thereby greatly to speed up the production of such popular sandwiches.

In an establishment for dispensing sandwiches of the type employing a cooked or grilled filler, it has been customary to have an attendant place the sandwich filler material on a grill and watch it carefully to see that it is properly cooked. Usually the bun halves or bread which go to complete the sandwich are heated for a short time just prior to completion of the cooking of the filler material. When the customary method referred to above is employed it is apparent that in an establishment where a very large sale of such sandwiches occurs a large number of attendants and grills are required. Furthermore, many of the filler materials are over cooked and others are grilled insufficiently by virtue of the human element involved. In addition, the bun halves or slices of bread, instead of being merely heated are often burned, scorched, or toasted in an undesirable manner. It would be desirable to provide a continuously operable high production machine for grilling sandwich filler material and heating the bread or bun halves whereby it is possible to heat such bread or bun halves in exactly the same manner for every sandwich and to grill the filler material to the same extent whereby to produce a uniform product. Automatic sandwich grillers have been provided heretofore. However, these arrangements have been either very expensive and difficult to clean or provided relatively unsatisfactory operation.

Accordingly it is an object of the present invention to provide a new and improved continuously operating high production automatic sandwich grill whereby the elements for making a sandwich can be inserted at one end and the completely cooked sandwich filler and other sandwich components can be removed from the other end without any attention whatsoever.

It is another object of the present invention to provide an automatic sandwich grill in which the completed sandwich components are delivered simultaneously.

It is another object of the present invention to provide an automatic sandwich grill which is simple and inexpensive to operate, foolproof in operation, is readily adapted for cleaning and is provided with means for automatically disposing of cooking fumes and vapors.

A still further object of the present invention is to provide an automatic sandwich grill of the

2 type referred to above which is sturdy, simple and inexpensive of construction but which will be easy to clean and simple to operate and maintain.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Fig. 1 is an elevational view of an automatic sandwich grill embodying the present invention with various portions thereof broken away to more clearly indicate the elements thereof;

Fig. 2 is an end view with portions of the housing broken away taken on line 2—2 of Fig. 1 assuming that Fig. 1 illustrates a complete device, and Fig. 3 is an end view taken on line 3—3 of Fig. 1 assuming again that Fig. 1 discloses a complete structure.

Referring now to the drawings there is illustrated the automatic sandwich grill of the present invention generally designated at 10 which comprises a rectangular frame 11 for supporting sheet metal walls such as the front wall 12 and end walls 13 and 14 so as to define a substantially completely enclosed housing which as will become apparent from the following description is in a sense an elongated oven or grill. Preferably the sheet metal walls such as 12, 13 and 14 are formed of stainless steel or the like to present a pleasing appearance.

It will be understood that the automatic sandwich grill of the present invention may be built of any size, although it is preferably designed so as to be mountable on a counter or in the window of a sandwich dispensing establishment. To give an idea of the size, an automatic sandwich grill built in accordance with the present invention had an overall length of the order of four feet, an overall height of between two and two and one-half feet, and a depth of less than two feet. It is obvious that an automatic sandwich grill of such a size is readily adapted for counter and other similar mounting and in view of the pleasing appearance which it presents it is especially adaptable for mounting in a show window where customers and others may observe its operation.

For the purpose of supporting the automatic sections of the sandwich grill 10 of the present invention there is provided a suitable supporting frame 15 disposed within the frame 11 and of substantially smaller dimensions as is clearly disclosed in Fig. 1 of the drawings. Suitably supported from the frame 15, preferably about midway between the top and bottom thereof is an elongated heating unit or plate generally designated at 16 which extends from the feed or intake end of the machine designated at 17 to the outlet of the machine generally designated at 18. This heating unit 16 may comprise any suitable heating unit such as a gas fired unit, or, as illustrated in the drawings an electric heating grill which is supplied with electrical energy through a conductor 19 leading to a suitable terminal box 20. Preferably the heating plate or grill 16 is adapted to be energized from a conventional source of 110 volt alternating current power source since that is most commonly available. It should be understood, however, that the particular construction of the heating unit 16 forms no part of the present invention and the only requirement with respect thereto is that it extends for a substantial distance between the inlet end 17 and the outlet end 18 of the automatic sandwich grill 10.

To support matter to be grilled or heated by the heating unit 16 there is provided an endless chain conveyor 22 which is drivingly supported by suitable sprocket wheels such as 23 mounted for rotation with a pair of spaced parallel shafts 24 and 25 which shafts are suitably journalled in the frame 15. As illustrated in Fig. 1 of the drawings the conveyor 22 is substantially longer than the frame 11 and a portion 22' thereof extends outside the feed or input end 17 of the sandwich grill 10. Actually the shaft 24 is journalled in a frame portion 26 which is an extension of the frame 15. A suitable opening 14a in the wall 14 is provided for the conveyor 22 which conveyor is provided with suitable means for supporting matter to be cooked, grilled, or heated. Such suitable means could comprise stainless steel rods or, as illustrated, a plurality of plates 28 formed of relatively thin material and preferably of stainless steel. Suitable material such as the bun bottoms 29 and the sandwich filler material 30 which latter might comprise a hamburger patty, a piece of cheese, a slice of tomato, or the like, are illustrated as being disposed on some of the plates 28. For the purpose of causing the upper flight of the conveyor 22 which is most closely adjacent to the heating unit 16 to move in a horizontal plane substantially parallel to the heating unit 16 from the input end 17 to the output end 18 suitable driving means to be described hereinafter are provided. The bread material such as the lower bun halves 29 and the sandwich filler material which might be a hamburger patty positioned on the lower bun half as illustrated in Fig. 1 of the drawings can readily be loaded on the plates 28 of the portion 22' of the conveyor 22 which extends outside the frame 11. It will be understood that the hamburger patties, for example, or whatever filler material is to be cooked is formed of standard dimensions so that in passing through the housing uniform cooking thereof occurs by virtue of the radiant heat received directly from the heating unit 16. By controlling the speed of the conveyor or the position of the heating unit 16 relative to the conveyor 22 operation of the sandwich grill 10 can be obtained to produce uniformly and satisfactorily cooked sandwich fillers with the lower bun halves or other bread material which might be employed heated but not toasted.

In order to complete the sandwiches the upper bun halves or the other bread material designated, for example, at 31 in Fig. 1 of the drawings is adapted to move on an endless conveyor such a chain conveyor 32 arranged above the heating unit 16 so that the bun tops 31 are adapted to move in a plane parallel with the heating unit 16. The conveyor 32 is also adapted to be mounted on suitable sprockets not shown supported by shafts 33 and 34. Suitable supporting means for the bun tops 31 such as the plates 35 similar to the plates 28 described in connection with the conveyor 22 may be provided. The conveyor 32 is entirely disposed within the housing supported by the frame 15. Bread materials such as bun tops 31 are supplied to the end of the conveyor 32 adjacent the intake 17 of the grill 10 as by a suitable chute such as is indicated at 37. The bread material such as the bun tops 31 should be heated but not toasted in their movement through the machine, and the position of the upper flight of the conveyor 32 relative to the heating unit 16 will determine the proper heating thereof.

For the purposes of simultaneously supplying all the components of a sandwich at the output side 18 of the machine 10 the conveyors 22 and 32 preferably move along at the same speed with the bun bottoms and filler being deposited through an opening 13a in the wall 13 on a slightly inclined chute 39 and the bun tops being dropped through an opening 13b in the wall 13 on a similar chute 40 whereby an attendant can assemble the sandwich on a plate to be served to a customer. In order to cause the conveyors 22 and 32 to move the material to be heated or cooked at the same speeds relative to the heating unit 16, the shaft 33 is provided with a suitable sprocket 41, and the shaft 25 is provided with a suitable sprocket 42 which sprockets are interconnected by a chain 43. A suitable chain tightener such as 44 may be provided if desired. With this arrangement it is apparent that if any one of the conveyors such as 22 or 32 is driven by suitable motive means, the other conveyor will also be driven at the same speed.

In order to cause the conveyors 22 and 32 to move the food to be heated or cooked through the oven portion of the sandwich grill 10 there is provided a suitable motive means such, for example, as an electric motor 45 which is illustrated as being belt connected to a suitable reduction gear mechanism such as 46, the belt connection between the motor 45 and the gear reduction mechanism 46 being illustrated at 47. If desired, the gear reduction mechanism 46 may be provided with speed control means whereby the speed of movement of the conveyors 22 and 32 may be variably controlled. The reduction gear mechanism 46 includes a sprocket 48 which is drivingly connected with a sprocket 49 connected to the shaft 34 by means of a chain 50. With this arrangement the motor 45 is adapted to drive the conveyors 22 and 32 in the manner described above, and in the event that a speed change mechanism is included in the reduction gear unit 46 the speed of the conveyors 22 and 32 may be controlled at will.

It is apparent that during the cooking and heating operation cooking fumes from the sandwich filler will be given off as well as vapor from the bread materials such as the bun portions. It is generally undesirable for such fumes and vapors to escape in the food dispensing establishment employing the sandwich grill 10 of the present invention. In accordance with the present invention therefore there is provided a suitable exhaust fan generally indicated at 52 which is illustrated as being directly connected to the driving motor 45. Fumes and vapor from the space 53 adjacent the output end 18 of the sandwich grill 10 are adapted to be sucked into the fan inlet as is clearly indicated by the arrows in Figs. 1 and 2 of the drawings. A suitable conduit such as 54 may be connected to the exhaust of the fan 52 to conduct the fumes and vapor outside the building in which the sandwich grill 10 is employed. As illustrated the motor 45 and fan 52 as well as the driving means such as the reduction gear mechanism 46 are all disposed within the housing supported by the frame 11 so as to provide a very pleasing appearance. The frame 15 as is best illustrated in Figs. 1 and 2 provides a suitable support for the motor 45, the fan 52, and the reduction gear unit 46.

It has been found that for a sandwich filler such as hamburger patties a five-minute cooking interval is desirable. The machine is adjusted therefore so that the speed of the conveyors 22 and 32 will provide the five-minute cooking interval. During normal use of the grill a single attendant can readily operate it by inserting the sandwich components at the entrance portion 17 thereof and assembling the sandwiches at the outlet 18. During heavy sales periods it is sometimes desirable to employ two attendants, one to continually load the machine and the other attendant to assemble the sandwich parts or components as they emerge from the grill onto the chutes 39 and 40. The second attendant who assembles the sandwich components is probably not required in most cases since the waiter or waitress serving the customers can assemble the sandwiches as required with a minimum of effort.

In view of the detailed description that has been included above, the operation of the automatic sandwich grill 10 of the present invention will be apparent to those skilled in the art. It will also be apparent that an improved sandwich grill is provided in which a single heating unit is adapted to heat the various sandwich components which move along on two conveyors, one on either side of the heating unit. With the present invention a uniformly cooked product can be obtained at all times with a minimum of handling and at greatly reduced labor. In addition, the sandwiches are automatically produced at high speed properly cooking the filler material without toasting or burning the other components of the sandwich but merely heating the same.

While there has been shown and described a particular embodiment of the present invention it will be obvious to those skilled in the art that various changes and modifications may be made without departing from the present invention and it is therefore aimed in the appended claims to cover all such changes and modifications as fall within the true spirit and scope of the present invention.

We claim:

1. An automatic sandwich grill comprising a housing, a single elongated longitudinally extending heating unit disposed in said housing, a first endless chain conveyor disposed in said housing on one side of said heating unit at one level, a second endless chain conveyor disposed on the other side of said heating unit at another level, means for supporting sandwich components such as bun halves on said first conveyor for heating by said heating unit, means for supporting sandwich components such as bun halves and uncooked sandwich filler on said second conveyor, means for simultaneously driving said conveyors so said sandwich componets move adjacent both sides of said single heating unit for cooking or grilling said filler and heating said bun halves during their movement relative to said heating unit, means for receiving said sandwich components at the ends of said conveyors, an exhaust fan for exhausting cooking fumes and vapors from said housing, and means for operatively relating said driving means and said exhaust fan.

2. An automatic sandwich grill comprising a housing, a single elongated longitudinally extending heating unit disposed in said housing, a first endless chain conveyor disposed above said heating unit with at least the upper flight of said conveyor substantially parallel to said heating unit, a second endless chain conveyor disposed below said heating unit with at least the upper flight of said second conveyor substantially parallel to said heating unit, means for supporting sandwich components on the upper flight of said first conveyor, means for supporting sandwich components on the upper flight of said second conveyor, and means for simultaneously driving said conveyors so said upper flights move in the same direction along said heating unit whereby all of said sandwich components are treated in a predetermined manner in their movement adjacent said single heating unit.

3. An automatic sandwich grill comprising a housing, a single elongated longitudinally extending heating unit disposed in said housing, a first endless chain conveyor disposed in said housing above said heating unit and extending parallel with the longitudinal axis of said unit, a second endless chain conveyor disposed below said heating unit and disposed in parallel relationship with respect to said first conveyor, means for supporting sandwich components such as bun halves on said first conveyor for heating by said heating unit, means for supporting sandwich components such as bun halves and superposed sandwich filler material on said second conveyor, means for simultaneously driving said conveyors so said sandwich components on both of said conveyors move in the same direction through said housing adjacent both sides of said single heating unit for cooking or grilling said filler material and heating said bun halves during their movement relative to said heating unit, and means for receiving said sandwich components at the ends of said conveyors.

4. An automatic sandwich grill comprising a housing, a single elongated longitudinally extending heating unit disposed in said housing, a pair of endless chain conveyors disposed in said housing one above and one below said single heating unit, means for supporting sandwich components on said conveyors for heating by said heating unit, means for simultaneously driving said conveyors in the same direction through said housing so that said sandwich components move adjacent both sides of said single heating unit for predetermined treatment thereof, one end of one of said conveyors extending outside said housing whereby said sandwich components may readily be placed on said first mentioned means, means for receiving said sandwich components at the other end of said one conveyor and the corresponding end of said other conveyor, and fan means for exhausting cooking fumes and vapors from said housing.

5. An automatic sandwich grill comprising a housing, a single elongated longitudinally extending heating unit disposed in said housing, a pair of endless chain conveyors disposed in said housing one above and one below said single heating unit, means including individual plates fastened to said conveyors for supporting sandwich components thereon for heating by said heating unit, means for simultaneously driving said conveyors in the same direction through said housing so that said sandwich components move adjacent both sides of said single heating unit for predetermined treatment thereof, one end of one of said conveyors extending outside said housing whereby said sandwich components may readily be placed on said plates, means for receiving said sandwich components at the other end of said one conveyor and the corresponding end of said other conveyor, an exhaust fan for exhausting cooking fumes and vapors from said housing, and means for operatively relating said driving means and said exhaust fan.

6. An automatic sandwich grill comprising a housing, a single elongated longitudinally extending heating unit disposed in said housing, a first endless chain conveyor disposed above said heating unit with at least the upper flight of said conveyor substantially parallel to said heating unit, a second endless chain conveyor disposed below said heating unit with at least the upper flight of said second conveyor substantially parallel to said heating unit, means for supporting sandwich components on the upper flight of said first conveyor, means for supporting sandwich components on the upper flight of said second conveyor, motive means for simultaneously driving said conveyors so said upper flights move in the same direction along said heating unit whereby all of said sandwich components are treated in a predetermined manner in their movement adjacent said single heating unit, and fan means connected to said motive means for removing cooking fumes from said housing.

7. An automatic sandwich grill comprising a housing, a single elongated longitudinally extending heating unit disposed in said housing, a first endless chain conveyor disposed above said heating unit with at least the upper flight of said conveyor substantially parallel to said heating unit, a second endless chain conveyor disposed below said heating unit with at least the upper flight of said second conveyor substantially parallel to said heating unit, means for supporting sandwich components such as bun tops on the upper flight of said first conveyor, means for supporting sandwich components such as stacked bun bottoms and sandwich filler material to be grilled on the upper flight of said second conveyor, means for simultaneously driving said conveyors so said upper flights move in the same direction along said heating unit whereby said sandwich filler material is grilled and said bun tops and bottoms are heated in their movement adjacent said single heating unit.

WALTER S. FREDENHAGEN.
MARK S. SCHMIDT.

REFERENCES CITED

The following references are of record in the file of this patent:

UNITED STATES PATENTS

| Number | Name | Date |
| --- | --- | --- |
| 1,440,643 | Strite | Jan. 2, 1923 |
| 1,443,242 | Roth | Jan. 23, 1923 |
| 1,536,538 | Stouffer | May 5, 1925 |
| 1,696,613 | Shroyer | Dec. 25, 1928 |
| 2,097,471 | Scharsch | Nov. 2, 1937 |
| 2,112,309 | Santillan | Mar. 29, 1938 |
| 2,147,335 | DeFazi | Feb. 14, 1939 |
| 2,182,229 | Hamel | Dec. 5, 1939 |
| 2,225,063 | Marriott | Dec. 17, 1940 |
| 2,238,309 | Cramer | Apr. 15, 1941 |
| 2,453,385 | Rone | Nov. 9, 1948 |

FOREIGN PATENTS

| Number | Country | Date |
| --- | --- | --- |
| 175,376 | Great Britain | Feb. 13, 1922 |